US012584416B2

(12) United States Patent
Ivakitch

(10) Patent No.: US 12,584,416 B2
(45) Date of Patent: Mar. 24, 2026

(54) O-RING FOR GAS TURBINE ENGINE

(71) Applicant: Pratt & Whitney Canada Corp., Longueuil (CA)

(72) Inventor: Richard Ivakitch, Scarborough (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/442,464

(22) Filed: Feb. 15, 2024

(65) Prior Publication Data

US 2025/0264030 A1 Aug. 21, 2025

(51) Int. Cl.
*F01D 11/02* (2006.01)
*F01D 11/00* (2006.01)

(52) U.S. Cl.
CPC ........ *F01D 11/003* (2013.01); *F05D 2240/35* (2013.01); *F05D 2240/55* (2013.01)

(58) Field of Classification Search
CPC .............. F16J 15/0893; F05D 2240/35; F05D 2240/55; F01D 11/003
See application file for complete search history.

(56) References Cited

U.S. PATENT DOCUMENTS 2,838,328 A * 6/1958 Rohrberg ............. F16J 15/0893 277/645
4,178,000 A * 12/1979 Kuttner ................ B22D 11/088 277/944
6,832,123 B2 12/2004 Bjornson et al.
11,754,185 B1 * 9/2023 Whitlow .............. F16J 15/3236 277/500
2006/0104806 A1 * 5/2006 Giesler ................... F02C 7/277 415/111
2008/0296849 A1 * 12/2008 Alacqua ............... F16J 15/0893 277/593
2013/0136583 A1 * 5/2013 Colombo ................. F16J 15/46 277/579
2014/0000258 A1 * 1/2014 Nishimoto ............. F01K 21/00 60/643
2014/0154053 A1 * 6/2014 Roberts ..................... F02C 7/28 415/121.3

(Continued)

FOREIGN PATENT DOCUMENTS

EP 3910166 A1 11/2021

OTHER PUBLICATIONS

Anonymous, "O-Ring Handbuch O-Ring Handbook", pp. 38, 58, 85, 103, 152, Parker Pradifa, Jul. 1, 2010, XP093244609, retrieved from the internet: https://www.vogel-gruppe.de/fileadmin/user_upload/Produktinformation_Parker/O-Ringe/Parker_O-Ringe_Handbuch_Pdf_ODE5705.pdf.

(Continued)

*Primary Examiner* — Eugene G Byrd
(74) *Attorney, Agent, or Firm* — CANTOR COLBURN LLP

(57) ABSTRACT

A seal arrangement of a gas turbine engine includes a first component and a second component abutting the first component. An O-ring is positioned in a gland volume defined between the first component and the second component. The O-ring has a hollow circular cross-sectional shape including a ring inner diameter and a ring outer diameter, with a hollow portion defined by the ring inner diameter. The ring inner diameter of the cross-sectional shape is defined as a function of a gland outer diameter, a gland inner diameter and a gland width.

6 Claims, 3 Drawing Sheets

(56) References Cited

U.S. PATENT DOCUMENTS

| | | | | |
|---|---|---|---|---|
| 2016/0369653 | A1 * | 12/2016 | Plickys | F15B 13/0871 |
| 2019/0292990 | A1 * | 9/2019 | Chabaille | F23R 3/28 |
| 2020/0173557 | A1 * | 6/2020 | Fadgen | F16J 15/3284 |
| 2021/0156272 | A1 * | 5/2021 | Yam | F01D 9/042 |
| 2022/0243816 | A1 * | 8/2022 | Langtry | F16J 15/0893 |

OTHER PUBLICATIONS

Extended European Search Report for EP Application No. 25157732.6, dated Jul. 30, 2025, pp. 1-8.

Parker Seals "Parker O-Ring Handbook", pp. 2-11, 3-4, 4-5, 4-13, Jan. 1, 2001, XP055196997, retrieved from the internet http://www.logwell.com/tech/O-ring/Parker_Handbook.pdf.

* cited by examiner

O-RING FOR GAS TURBINE ENGINE

BACKGROUND

Exemplary embodiments of the present disclosure pertain to the art of gas turbine engines.

Traditional fluorocarbon O-rings, for use with engine oil, are limited to temperatures below ~350 F. Some specially designed materials can be used at higher temperatures, up to 500 F, however the mechanical properties are those materials differ significantly from the existing standard fluorocarbon O-rings. Most notably, the thermal expansion of the new material is much greater.

O-rings using the new material must typically be used with a modified gland size to accommodate an increase in thermal expansion of the O-ring material. ie: the gland size must be larger. If a smaller size O-ring of the new material was defined to fit into an existing gland size, it would not meet the minimum pinch requirements of the O-ring.

BRIEF DESCRIPTION

In one exemplary embodiment, a seal arrangement of a gas turbine engine, includes a first component and a second component abutting the first component. An O-ring is positioned in a gland volume defined between the first component and the second component. The O-ring has a hollow circular cross-sectional shape including a ring inner diameter and a ring outer diameter, with a hollow portion defined by the ring inner diameter. The ring inner diameter of the cross-sectional shape is defined as a function of a gland outer diameter, a gland inner diameter and a gland width.

Additionally or alternatively, in this or other embodiments the O-ring is configured to operate at temperatures greater than 350 degrees Fahrenheit.

Additionally or alternatively, in this or other embodiments the first component includes a seal groove at least partially defining the gland volume.

Additionally or alternatively, in this or other embodiments the ring inner diameter is in a range of 0.2-0.4 times the ring outer diameter.

Additionally or alternatively, in this or other embodiments the ring inner diameter is determined by Formula 1.

Additionally or alternatively, in this or other embodiments the first component and the second component are disposed at a bearing assembly of the gas turbine engine.

In another exemplary embodiment, a gas turbine engine includes a combustor, and at least one spool. The at least one spool includes at least one rotating component driven by products of the combustor, and a bearing assembly supportive of the at least one rotating component. The bearing assembly includes a seal arrangement including a first component, a second component abutting the first component, and an O-ring positioned in a gland volume defined between the first component and the second component. The O-ring has a hollow circular cross-sectional shape including a ring inner diameter and a ring outer diameter, with a hollow portion defined by the ring inner diameter. The ring inner diameter of the cross-sectional shape is defined as a function of a gland outer diameter, a gland inner diameter and a gland width.

Additionally or alternatively, in this or other embodiments the O-ring is configured to operate at temperatures greater than 350 degrees Fahrenheit.

Additionally or alternatively, in this or other embodiments the first component includes a seal groove at least partially defining the gland volume.

Additionally or alternatively, in this or other embodiments the ring inner diameter is in a range of 0.2-0.4 times the ring outer diameter.

Additionally or alternatively, in this or other embodiments the ring inner diameter is determined by Formula 1.

In yet another exemplary embodiment, a method of assembling a seal arrangement of a gas turbine engine includes at least partially defining a gland volume at a first component the gas turbine engine, and installing a high-temperature O-ring into the gland volume. The high-temperature O-ring has a hollow circular cross-sectional shape including a ring inner diameter and a ring outer diameter, with a hollow portion defined by the ring inner diameter. The ring inner diameter of the cross-sectional shape is defined as a function of a gland outer diameter, a gland inner diameter and a gland width. A second component of the gas turbine engine is installed over the high-temperature O-ring and the first component, to at least partially compress the high-temperature O-ring.

Additionally or alternatively, in this or other embodiments a fluorocarbon O-ring is removed from the first component before installing the high-temperature O-ring to the first component.

Additionally or alternatively, in this or other embodiments the high-temperature O-ring is configured to operate at temperatures greater than 350 degrees Fahrenheit.

Additionally or alternatively, in this or other embodiments a seal groove is formed in the first component to at least partially defining the gland volume.

Additionally or alternatively, in this or other embodiments the ring inner diameter is defined in a range of 0.2-0.4 times the ring outer diameter.

Additionally or alternatively, in this or other embodiments the ring inner diameter is defined by Formula 1.

Additionally or alternatively, in this or other embodiments the first component and the second component are located at a bearing assembly of the gas turbine engine.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
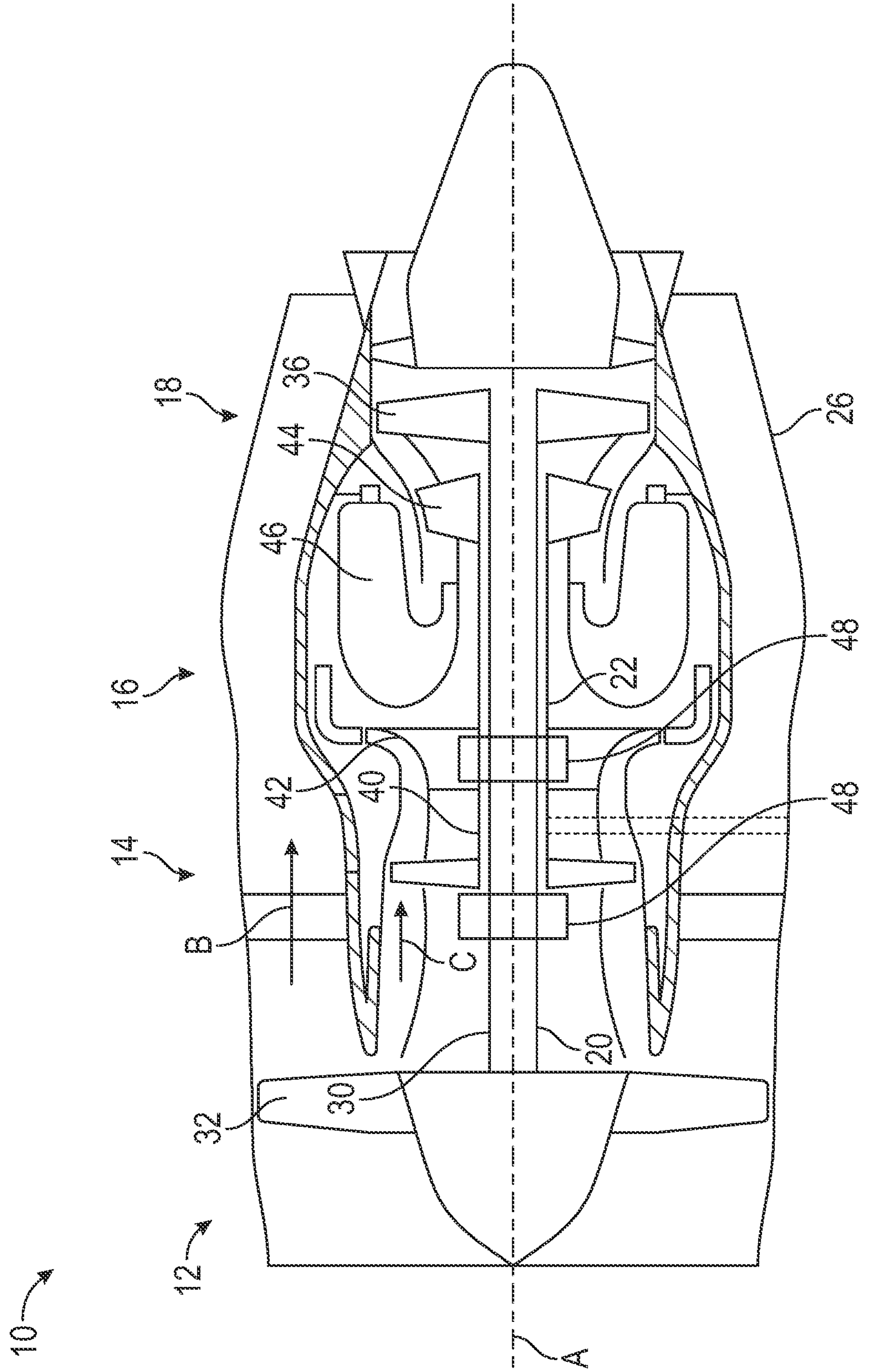
FIG. 1 is a partial cross-sectional view of an embodiment of a gas turbine engine.

FIG. 1 schematically illustrates a gas turbine engine 10. The gas turbine engine 10 is disclosed herein as a two-spool turbofan that generally incorporates a fan section 12, a compressor section 14, a combustor section 16 and a turbine section 18. Alternative engines might include other systems or features. The fan section 12 drives air along a bypass flow path B in a bypass duct, while the compressor section 14 drives air along a core flow path C for compression and communication into the combustor section 16 then expansion through the turbine section 18. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 10 generally includes a low speed spool 20 and a high speed spool 22 mounted for rotation about an engine central longitudinal axis A relative to an engine static structure 26.

The low speed spool 20 generally includes an inner shaft 30 that interconnects a fan 32, and a low pressure turbine 36. The high speed spool 22 includes an outer shaft 40 that interconnects an impeller 42 and high pressure turbine 44. A combustor 46 is arranged in exemplary gas turbine 10 between the impeller 42 and the high pressure turbine 44. An engine static structure 36 is arranged generally between the high pressure turbine 44 and the low pressure turbine 36. The inner shaft 30 and the outer shaft 40 are concentric and rotate about the engine central longitudinal axis A which is collinear with their longitudinal axes.

The core airflow is compressed by the impeller 42, mixed and burned with fuel in the combustor 46, then expanded over the high pressure turbine 44 and low pressure turbine 36. The turbines 36, 44 rotationally drive the respective low speed spool 20 and high speed spool 22 in response to the expansion. It will be appreciated that each of the positions of the fan section 12, compressor section 14, combustor section 16, and turbine section 18, may be varied. While the structure described herein is a two-spool gas turbine engine 10, one skilled in the art will readily appreciate that the present disclosure may be similarly applied to a single spool or three or more spool gas turbine engine 10.

Figure 2:
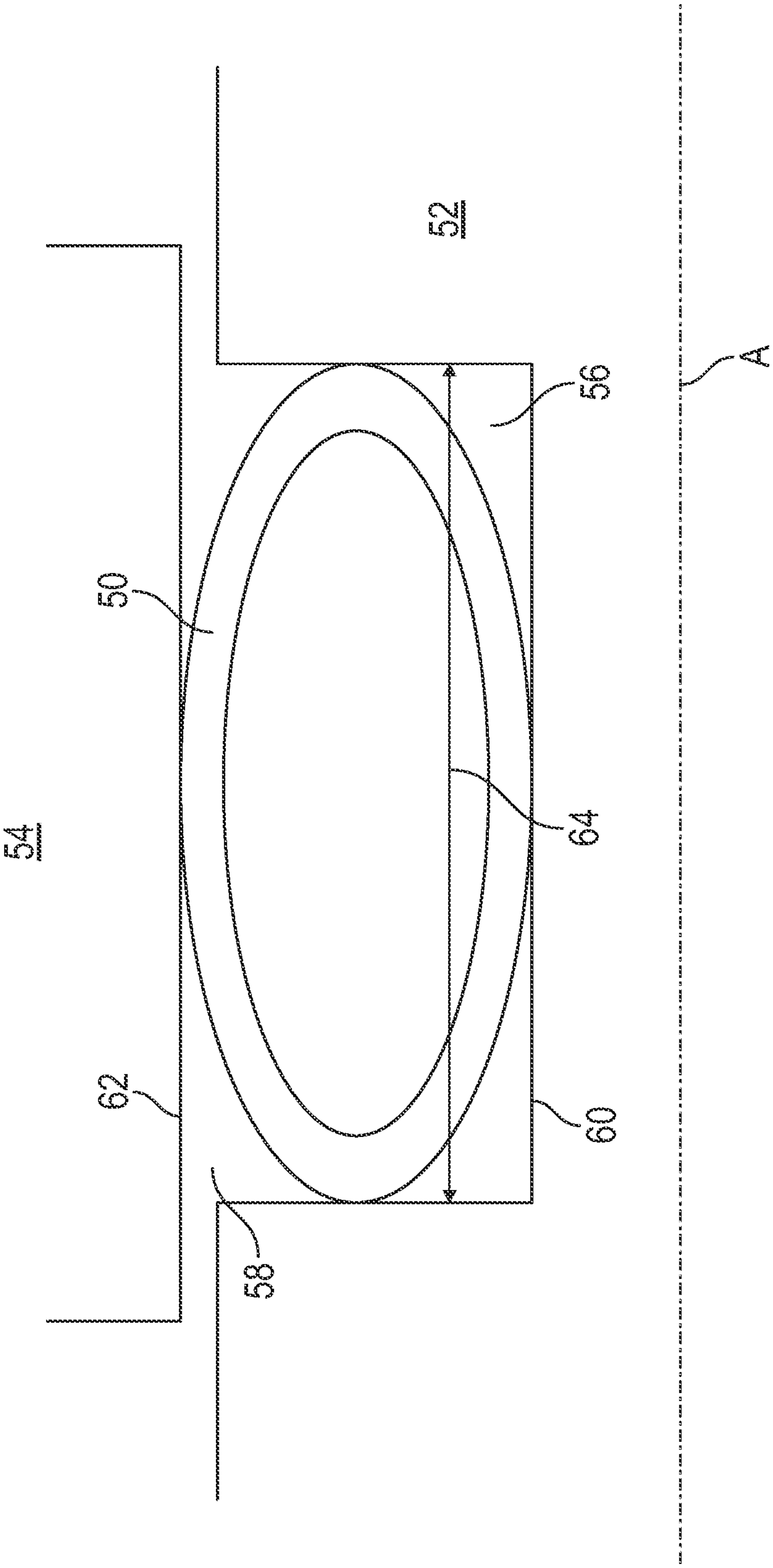
FIG. 2 is a partial cross-sectional view of an embodiment of a sealing arrangement of a gas turbine engine.

The low speed spool 20 and the high speed spool 22 are supported by one or more bearing assemblies 48. Referring now to FIG. 2, to retain lubricant at the bearing assembly 48 and reduce undesired leakage of lubricant out of the bearing assembly 48, seals such as O-rings 50 are utilized. The O-ring 50 is configured to seal between a first component 52 and a second component 54. In some embodiments, the O-ring 50 is at least partially positioned in a seal groove 56 of the first component 52 and extends circumferentially about the engine central longitudinal axis A. When the second component 54 is installed to the first component 52, the seal groove 56 and the second component 54 define a gland 58 in which the O-ring 50 is positioned. With the second component 54 installed to the first component 52 the O-ring 50 is at least partially compressed in the gland 58. The gland 58 has a gland inner diameter defined at a seal groove base 60 of the first component 52, and has a gland outer diameter defined by a radial inner surface 62 of the second component 54. Additionally, the gland 58 has a gland width defined by an axial groove width 64 of the seal groove 56.

It is desired to replace existing fluorocarbon O-rings on engines in service with newer higher temperature capability O-rings 50, with no modifications to the first component 52 and the second component 54. In some embodiments, due to differences in materials the thermal expansion of the O-ring 50 is greater than that of the fluorocarbon O-ring that the O-ring 50 is replacing. In some embodiments, the difference in thermal expansion is 2×, meaning that the O-ring 50 expands twice as much as the fluorocarbon O-ring at the operating temperature of the O-ring 50. Thus, the O-ring 50 will need to be sized and configured to account for the difference in thermal expansion, while still ensuring that pinch requirements of the O-ring 50 are also met.

Figure 3:
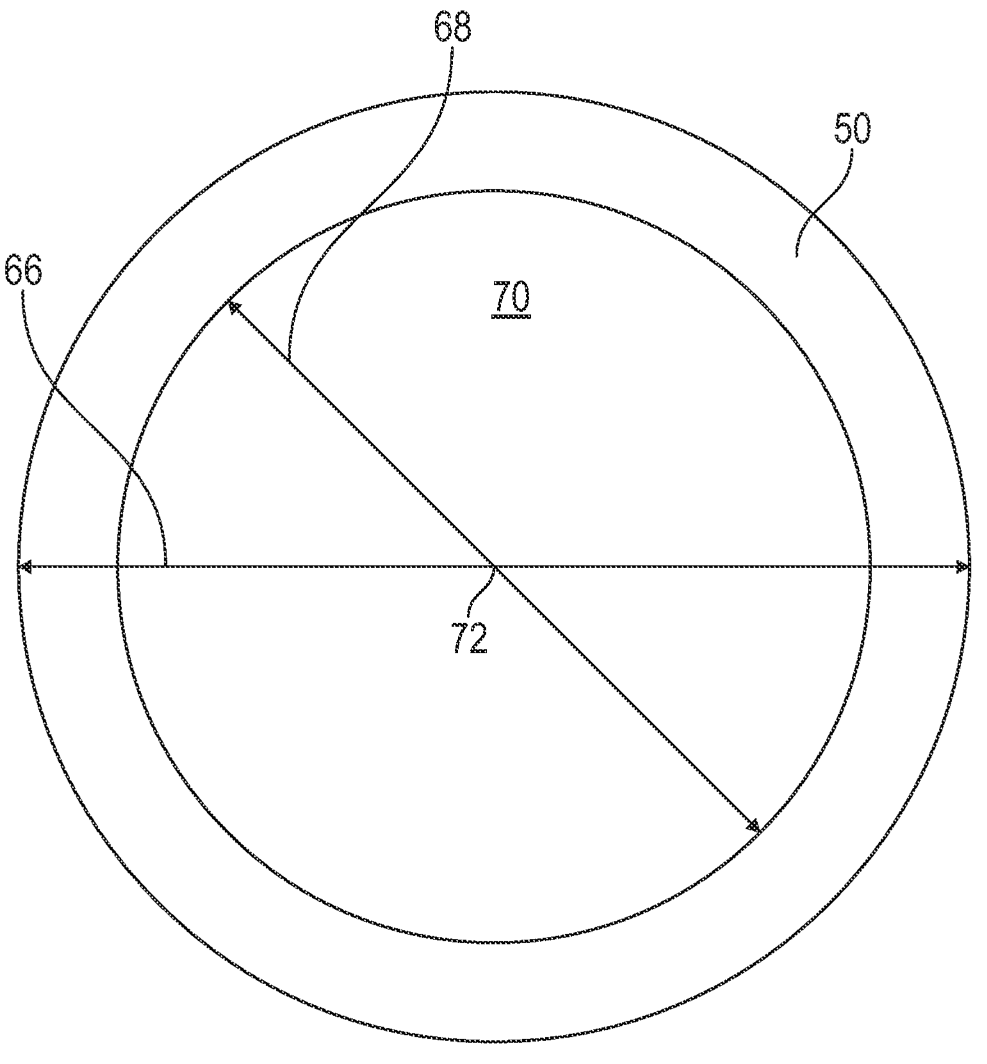
FIG. 3 is a cross-sectional illustration of an embodiment of an O-ring.

An embodiment of an exemplary O-ring 50 is illustrated in FIG. 3. The O-ring 50 has a circular, hollow cross-sectional shape. The cross-sectional shape includes a ring outer diameter 66 and a ring inner diameter 68, with the seal material disposed between the ring inner diameter 68 and the ring outer diameter 66. A hollow portion 70 of the cross-sectional shape is defined radially inboard of the ring inner diameter 68 relative to a cross-sectional center 72 of the cross-sectional shape.

When replacing a fluorocarbon O-ring with the O-ring 50 formed from a high temperature material in the structure, the ring outer diameter 66 of the O-ring 50 is the same as that of the fluorocarbon O-ring that it replaces. This is done in order for the O-ring 50 to fit within the existing gland 58 space and the ring inner diameter 68 is thus sized to provide a desired hollow portion 70 size so the O-ring 50 meets the pinch requirements and/or other performance characteristics of the O-ring 50. In some embodiments, the ring inner diameter 68 is sized via the following Formula 1:

$$ORingInnerDiameterMin = 2 \times \sqrt{\left(\left(\frac{GlandOD - GlandID}{2}\right) \times (GlandWidth) \times 0.05\right)/\pi}$$

The ring inner diameter 68, which defines the hollow portion 70, is a function of the gland outer diameter, the gland inner diameter, and the gland width, as previously defined herein. In some embodiments, the resultant ring inner diameter 68 is in a range of 0.2-0.4 times the ring outer diameter 66. The formula is based on a nominal 75% fill ratio, where fill ratio is defined as a ratio of O-ring cross-sectional area to gland cross-sectional area. Additionally, in some embodiments the high temperature material is defined as one having a coefficient of thermal expansion equal to or greater than 0.00022 in/in/degF.

By way of example, in one embodiment it is desired to replace an O-ring having an outer diameter of 0.103" with an O-ring 50 having a hollow cross-section. At this location, the gland outer diameter is 1.44125", the gland inner diameter is 1.276" and the gland width is 0.140". Using Formula 1, the desired ring inner diameter 68 for the O-ring 50 is 0.027". The resulting O-ring 50 has a hollow, circular cross-sectional shape with a ring outer diameter 66 of 103" and a ring inner diameter 68 of 0.027". The resultant O-ring 50 formed from the high-temperature capable material seals the gland 58 while meeting the pinch requirement and other performance requirements of the O-ring 50.

The term "about" is intended to include the degree of error associated with measurement of the particular quantity based upon the equipment available at the time of filing the application. For example, "about" can include a range of +8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of assembling a seal arrangement of a gas turbine engine, comprising:

at least partially defining a gland volume at a first component the gas turbine engine;

installing a high-temperature O-ring into the gland volume, the high-temperature O-ring having a hollow circular cross-sectional shape including a ring inner diameter and a ring outer diameter, with a hollow portion defined by the ring inner diameter;

wherein the ring inner diameter of the cross-sectional shape is defined as a function of a gland outer diameter, a gland inner diameter and a gland width; and installing a second component of the gas turbine engine over the high-temperature O-ring and the first component, to at least partially compress the high-temperature O-ring;

further comprising removing a fluorocarbon O-ring from the first component before installing the high-temperature O-ring to the first component.

2. The method of claim 1, wherein the high-temperature O-ring is configured to operate at temperatures greater than 350 degrees Fahrenheit.

3. The method of claim 1, further comprising forming a seal groove in the first component to at least partially defining the gland volume.

4. The method of claim 1, further comprising defining the ring inner diameter in a range of 0.2-0.4 times the ring outer diameter.

5. The method of claim 1, further comprising defining the ring inner by Formula 1.

6. The method of claim 1, wherein the first component and the second component are disposed at a bearing assembly of the gas turbine engine.

* * * * *